United States Patent
Bardini et al.

(10) Patent No.: US 11,436,321 B2
(45) Date of Patent: Sep. 6, 2022

(54) SAFE GUARD DETECTION FOR UNEXPECTED OPERATIONS IN A MES SYSTEM

(71) Applicant: SIEMENS AKTIENGESELLSCHAFT, Munich (DE)

(72) Inventors: Matteo Bardini, Genoa (IT); Alessio Dellacha', Genoa (IT); Corrado Tasca, Genoa (IT); Davide Risso, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 354 days.

(21) Appl. No.: 16/448,301

(22) Filed: Jun. 21, 2019

(65) Prior Publication Data

US 2019/0392141 A1 Dec. 26, 2019

(30) Foreign Application Priority Data

Jun. 21, 2018 (EP) .................................. 18178935

(51) Int. Cl.
*G06F 21/55* (2013.01)
*G06N 20/00* (2019.01)
*G05B 19/418* (2006.01)

(52) U.S. Cl.
CPC ..... *G06F 21/554* (2013.01); *G05B 19/41865* (2013.01); *G05B 19/41885* (2013.01); *G06N 20/00* (2019.01); *G05B 2219/23317* (2013.01)

(58) Field of Classification Search
CPC .................. G06F 21/554; G06N 20/00; G05B 19/41865; G05B 19/41885; G05B 2219/23317

(Continued)

(56) References Cited

U.S. PATENT DOCUMENTS

| 8,670,868 | B2 | 3/2014 | Emmertz et al. |
| 9,069,954 | B2 | 6/2015 | Anurag |

(Continued)

FOREIGN PATENT DOCUMENTS

| WO | 2011149773 A2 | 12/2011 |
| WO | 2012022381 A1 | 2/2012 |

OTHER PUBLICATIONS

Park et al., IEEE Access 2017, "Security Architecture for a Secure Database on Android", pp. 11482-11501. (Year: 2017).*

(Continued)

*Primary Examiner* — Khalil Naghdali
(74) *Attorney, Agent, or Firm* — Laurence A. Greenberg; Werner H. Stemer; Ralph E. Locher

(57) ABSTRACT

A method for performing a safe guard detection of unexpected operations launched by an operator for a manufacturing execution system (MED system) is based on a first database containing a set of operations, a set of operators, calendar information for a shift and calendar information for the equipment of the MES-system. The MES-systems further has a second database containing a login history of carried out logins of the operator. The detection of a malicious operation is carried out as to whether the operation complies with a set of rules defining allowed operations or with a learning module, in which specific roles of operators are contained and whether an operation complies with a specific role. In case of non-compliance, the operation is stored as an entry in an event trace file for generating alerts.

12 Claims, 3 Drawing Sheets

1) Learning Phase

Learning Set

2) Runtime Phase

New operation

Decision Phase

(58) Field of Classification Search
USPC .......................................................... 726/22
See application file for complete search history.

(56) References Cited

U.S. PATENT DOCUMENTS

| | | | | |
|---|---|---|---|---|
| 9,792,573 | B2* | 10/2017 | Furbeck | G06Q 50/04 |
| 2008/0097623 | A1* | 4/2008 | Weatherhead | G05B 19/41865 |
| | | | | 700/3 |
| 2012/0116547 | A1 | 5/2012 | Shigehara | |
| 2013/0081141 | A1* | 3/2013 | Anurag | G06F 21/577 |
| | | | | 726/23 |
| 2013/0123964 | A1* | 5/2013 | Cooper | G06F 3/065 |
| | | | | 700/97 |
| 2013/0158708 | A1* | 6/2013 | Emmertz | G05B 19/0426 |
| | | | | 700/248 |
| 2013/0196649 | A1* | 8/2013 | Paddon | H04W 12/122 |
| | | | | 455/423 |
| 2013/0269030 | A1* | 10/2013 | Milford | G06F 11/3409 |
| | | | | 726/22 |
| 2014/0059578 | A1 | 2/2014 | Voth et al. | |
| 2015/0262095 | A1* | 9/2015 | Rajasekaran | G06Q 10/0635 |
| | | | | 705/7.28 |
| 2016/0070258 | A1* | 3/2016 | Raviola | G06Q 10/06 |
| | | | | 700/100 |
| 2017/0277173 | A1* | 9/2017 | Bonomi | G06Q 50/04 |
| 2018/0167402 | A1* | 6/2018 | Scheidler | G06F 21/554 |
| 2018/0259943 | A1* | 9/2018 | Borriello | G06Q 50/00 |
| 2018/0307840 | A1* | 10/2018 | David | G06F 21/64 |
| 2018/0356792 | A1* | 12/2018 | Chao | G05B 19/41835 |

OTHER PUBLICATIONS

Loe, et al., "A Comparison of Methods for Implementing Adaptive Security Policies", Proceedings of the 7th USENIX Security Symposium, San Antonio, TX, Jan. 26-29, 1998; URL: http://static.usenix.org/legacy/publications/library/proceedings/sec98/full_papers/loe/loe.pdf.

GE's Intelligent Platforms Business & Cisco Systems Inc., "Architecting a robust manufacturing network for the Internet of Things", Aug. 2015, pp. 1-17, URL: https://www.ge.com/digital/sites/default/files/Architecting-a-Robust-Manufacturing-Network.pdf.

* cited by examiner

FIG 4
1) Learning Phase
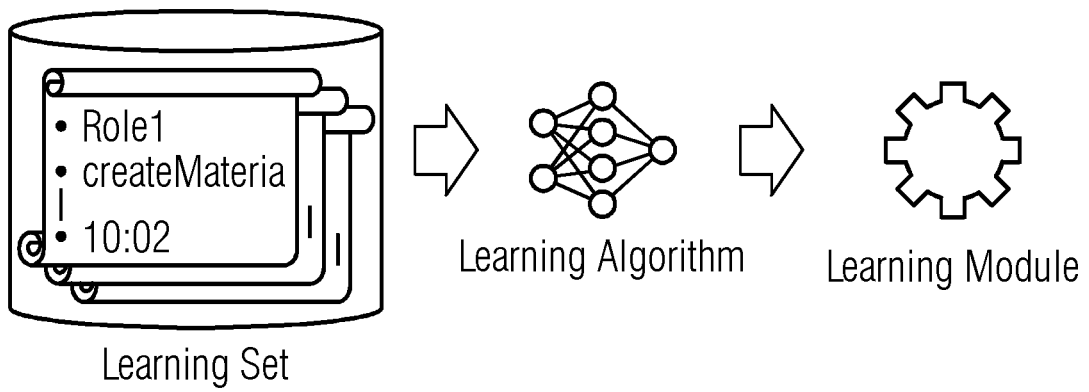
2) Runtime Phase
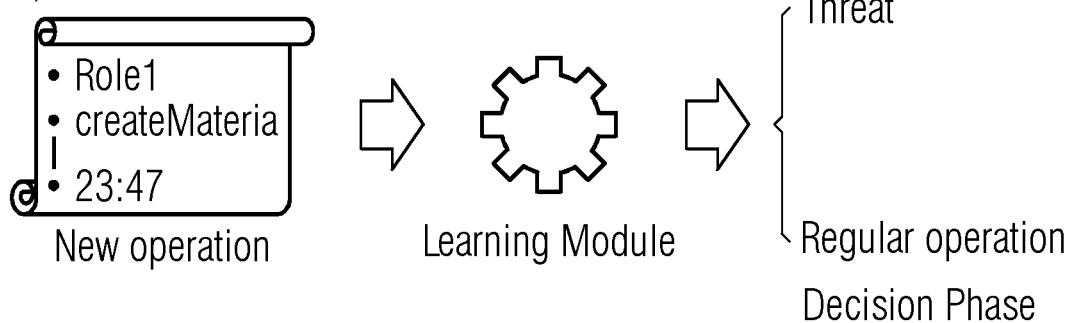

SAFE GUARD DETECTION FOR UNEXPECTED OPERATIONS IN A MES SYSTEM

CROSS-REFERENCE TO RELATED APPLICATION

This application claims the priority, under 35 U.S.C. § 119, of European application EP 18 178 935.5, filed Jun. 21, 2018; the prior application is herewith incorporated by reference in its entirety.

BACKGROUND OF THE INVENTION

Field of the Invention

The present invention relates to a method for a safe guard detection of unexpected operations launched by an operator for a manufacturing execution system (MES) according to the claims.

As defined by the Manufacturing Enterprise Solutions Association (MESA International http://www.mesa.org, a MES/MOM system «is a dynamic information system that drives effective execution of manufacturing operations». This is done by managing «production operations from point of order release into manufacturing to point of product delivery into finished goods» and by providing «mission critical information about production activities to others across the organization and supply chain via bi-directional communication». Most recently, the term manufacturing operation management (MOM) is more and more used to replace the term MES. However, in this document the term MES will be used and understood in both meanings as cited before.

The functions that MES/MOM systems usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking.

In this context IT factory security is getting more and more important and critical for the business. The fourth industry revolution («Industry 4.0») is moving the digitalization even deeper in the manufacturing production: With concepts like MOM as SaaS, IIoT, centralized private cloud etc., the factory cannot be seen anymore as an entity completely separated from the outside world. For instance, for almost everything related to cloud computation, a remote access via an internet access is needed and therefore available. Moreover, with the wide spreading of plant remote assistance, a malicious operator/user has far more opportunities than in the past for an intrusion in a plant data center or accessing directly to the site production operations.

Experts agree that old methods for protecting Information Technology (IT) and Operational Technology (OT) separately cannot work anymore (source), and can only create more and more paths and shortcuts for malicious intrusions. In short, we need a more homogeneous solution that combines both worlds in order to create a better picture of the factory, the digital twin for the security world.

An example of possible threats is given: What could happen if a worker starts requesting the execution of a certain operation without specific reason? This worker may do it either by mistake or accidentally and causes a loss on the factory. A remote malicious operator could do this also. It is very difficult to classify such a single request as malicious or as a mistake.

In detail some of the real security problems related with the manufacturing MES/MOM are the following ones:
i) A certain operation is called outside its regular scope, i.e. while assembling a worker requests the maintenance of the robot aide, blocking the production.
ii) In case the line should produce the product "A" 100 times per day on a line, but the line management starts receiving request of production in the order of thousands.
iii) Consecutive requests of an unauthorized operator.
iv) Consecutive login requests (this can be a DoS attack).
v) In case of not scheduled, i.e. the current line should produce the item "A" but for unclear reasons a request is triggered concerning the product "B".

The concept of adaptive security is well known in the ICT world, with the «Network intrusion detection system» as one of the most known representatives, a detailed description is available under

[Doc 1] published in 1998 describes four methods for the implementation of adaptive security policies based on the concept separate the definition of a security policy from the enforcement of a security policy. The four methods comprise:

Reloading a new security database for the Security Server;

Expanding the state and security database of the Security Server to include more than one mode of operation;

Implementing another Security Server and handing off control for security computations; and Implementing multiple, concurrent Security Servers each controlling a subset of processes.

[Doc 2] published in 2015 addresses the network security aspects by proposing a network reference architecture. Reference is especially made to the following figures in [Doc 2]:
  FIG. 2: Plant Network Segmentation,
  FIG. 3: Plant Network Security Logical Architecture, and
  FIG. 6: Plant Network Physical Architecture.

U.S. patent publication No. 2014/0059578 A1 discloses an architecture to assemble and manage usage information in an intelligent TV. At a first glance, this document seems not to be related with the topic of a concept of adaptive security in a «Industry 4.0» and IIoT environment. However, these concepts can be used for the analysis of a remote user behavior.

SUMMARY OF THE INVENTION

The goal of the present invention is to provide a method and a system for safe guard detection for unexpected operations being launched by an operator for a MES-environment.

This aim is reached by a method specified with the features specified in the independent claims.

The first independent method claim relates to a safe guard detection of unexpected operations launched by an operator for a manufacturing execution system according to the invention is based on:
a) a first database containing:
  a set of operations;
  a set of operators;
  calendar information for a shift;
  calendar information for the equipment of a MES-System;
b) a second database containing a login history of carried out logins of the operator; and c) a set of rules defining allowed combinations of operations being launched by an operator at a specific time according to the content of the first database.

The method includes the steps of:

a) checking launched operations as to whether they comply with the set of rules, b) in a case of non-compliance of a launched operation, storing the launched operation together with data identifying the operator and his login data as an entry in an event trace file;

c) analysing the entries in the event trace file by an intrusion detection system; and d) generating alerts based on the analysis of the entries in the event trace file.

The method according to the second method claim for a safe guard detection of unexpected operations launched by an operator for a manufacturing execution system according to the invention is based on a) a first database containing:
    a1) a set of operations;
    a2) a set of operators;
    a3) calendar information for a shift;
    a4) calendar information for the equipment of a MES-System;

b) a second database containing:
    b1) a login history of carried out logins of the operator; and c) a machine learning model.

The method includes the following steps of:

a) cataloguing an operator in a given role in the MES-System;

b) in a learning phase feeding a learning module being part of the machine learning model with launched operations for that role;

c) in a run time phase checking launched operations whether they comply with the operations in the learning module;

d) in case of non-compliance of a launched operation storing said launched operation together with data identifying the operator and his login data as an entry in an event trace file;

e) analysing the entries in the event trace file by an intrusion detection system; and f) generating alerts based on the analysis of the entries in the event trace file.

The invention offers specifically:

a) A method based on the concept of adaptive security for analysing and detecting possible malicious operations in the context of the manufacturing production. The method generates inputs for the IDS in order to equalize standard malicious operations to the one more related to the manufacturing world.

b) The system crosscheck data belonging to the MES-System with statistical data regarding the operators' routine. The advantage is to reveal automatically unexpected operations, both intentional and voluntary ones and take actions in time for mitigate possible losses.

c) Considering workers group (we call them role) and not the single worker we do not invade the individual privacy but at the same time we can generate a good model.

d) The chosen MOM data are the following:
    d1) Shift Calendar information;
    d2) Scheduling; and
    d3) Production Rate and Information.

In respect with a traditional IDS data source, the MES-data from the proposed method can give a better picture for what is happening to the plant, as well as gives the best way for really detecting malicious operations aimed to generate loss in the production.

Other features which are considered as characteristic for the invention are set forth in the appended claims.

Although the invention is illustrated and described herein as embodied in a safe guard detection for unexpected operations in a MES system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 4 is an illustration of a structure of a machine-learning model.

DETAILED DESCRIPTION OF THE INVENTION

For the sake of a uniform nomenclature, the term «operator» will be consequently used although in a specific context the term «user» is more common, as e.g. «user administration» of for accessing an IT-System.

A safe guard detection for unexpected operations being launched by an operator for a MES system preferably includes the following events and/or categories.

1. Login Not Compliant with the Planned Shift

Figure 1:
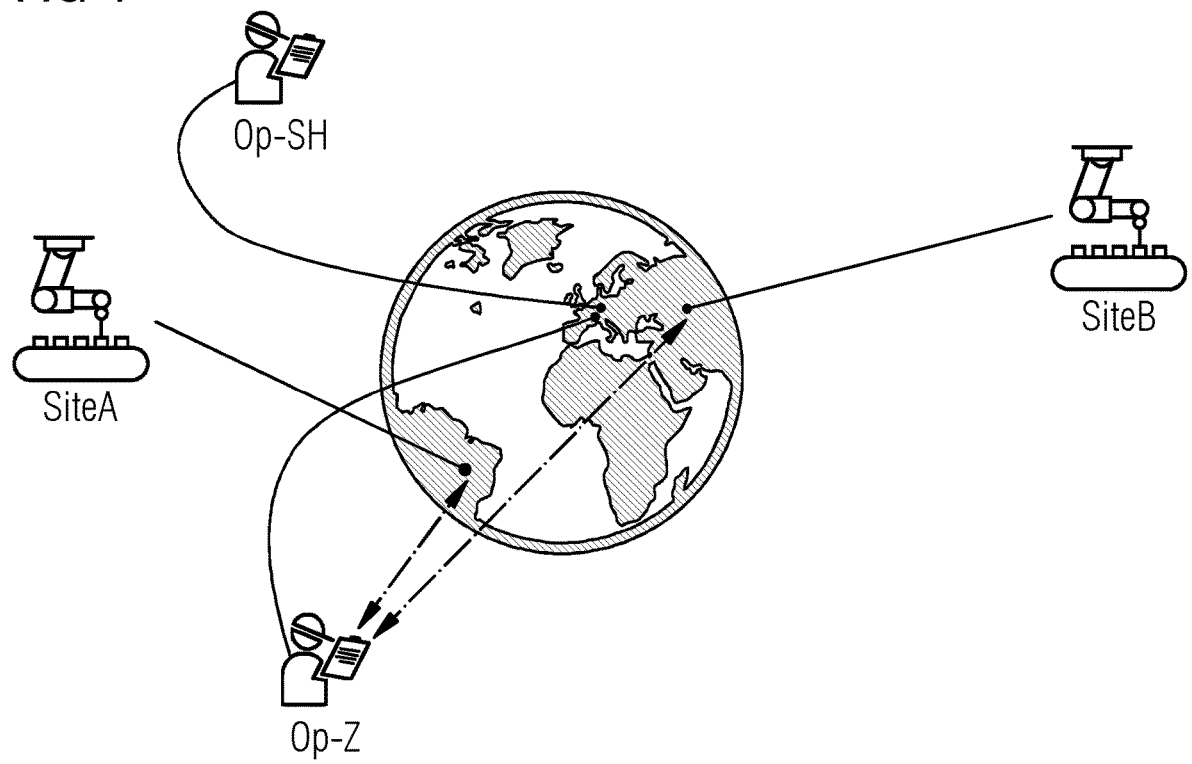
FIG. 1 is an illustration showing a typical and not fraudulent situation with an operator working for different sites around the world.

The information belonging to a shift calendar is used to verify whether an incoming login can be expected. In this context reference is made to FIG. 1, which shows two sites siteA, siteB on different continents. The before mentioned verification based alone on the static shift calendar is in a situation according to FIG. 1 obviously not applicable. Not in all cases, but in certain cases a login has to be permitted outside the allowed time-periods according to the shift calendar. This category "Login not compliant with the planned shift" alone does not allow to identify an operation launched by a malicious operator.

2. Shift Calendar Information

The category "Shift Calendar Information" can however give a precise idea whether an operator is meant to be at work and in which (geographical) area he is expected to be at work, example:

An operator is performing an operation on resources, but according to the shift calendar information, he was not scheduled to be at work in that moment. This is not covered by point 1 since in this case a malicious user managed to bypass the authentication layer.

3. Equipment Shift Information

The equipment of a site and/or production line is considered as a resource. As a consequence this equipment is subject to a shift scheduling. This consideration on a category "equipment shift information" is therefore similar to cipher 2 as explained above, where the category "shift calendar information" relates to operators (=persons).

4. Launched Operation Not Compliant with the Order Scheduling

An operation launched by an operator is compared against what is planned according to a given order. The result of such a comparison can be used for detecting potentially operations launched by a malicious operator. In a not very precise language sometimes such an operation is also called a malicious operation. The result of this comparison leads to an event called "Launched operation not compliant with the order scheduling".

5. Crosschecking of Logins/Logouts with the User Management Login History

Intentionally the term user management is used for this category "Crosschecking of logins/logouts" in order to make a relation to the common user management for accessing an IT-System. The usual user management covers also the management of the operators for a MES-System. A user management includes the creation of a login history file in which all logins and logouts of a user or of a group of users are recorded. Such a login history file allows a creation of statistical data as e.g. the usual login and logout time. Deviations of a login time or a logout time from the usual statistical login time or logout time can be used as a warning indicator, which should be notified for further clarification or investigation. This warning indicator can be a basis with other indicators for a detection of a malicious operator. The above explained recording of deviations is here summarized under the term "crosschecking of logins/logouts with the user management log-file".

Figure 3:
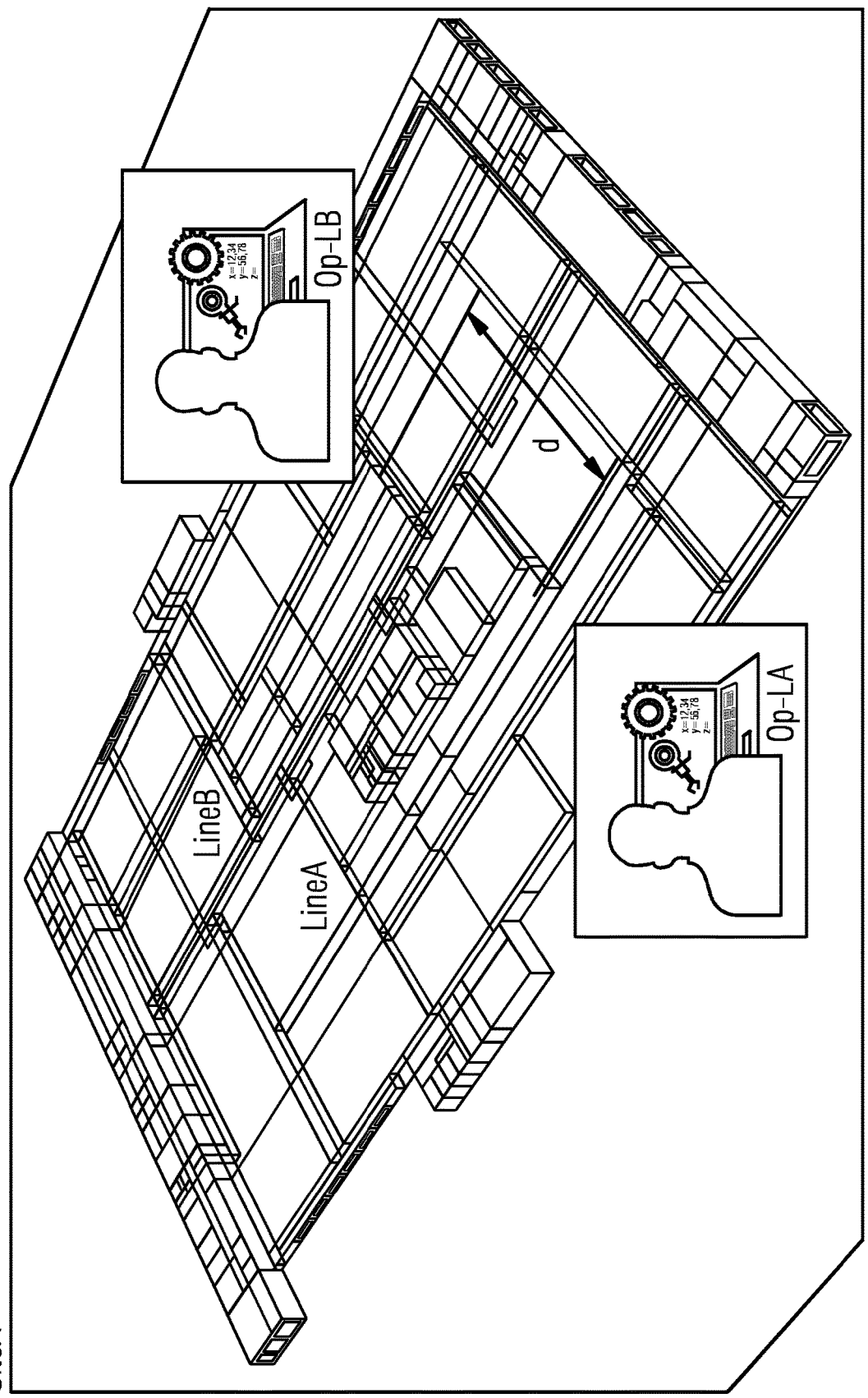
FIG. 3 is an illustration of a situation at a site containing two production lines each requiring a line operator close to that production line.

This category "Crosschecking of logins/logouts" is especially useful for tracking cases where the same operator logs-in himself at different places at the same time where such simultaneous logins may not be expected. FIG. 3 illustrates this: A so-called line operator Op-L or Op-LB has to be physically present at the production line for which he has the role "line operator". Instantaneous login's can be tracked in a completely different way. It does not need a posteriori analysis and can performed directly by the user management. To this category belong cases where logins do not happen at the exactly same time but where logins are very close (in time) but far (in space). For instance, considering a multi lines site, with a line A very far from a line B, e.g. d=300 m in FIG. 3, and where there is no transportation available from line a To line B. Assuming a user login takes place at a panel of line A and some seconds later at a panel of line B. Under consideration of a set up as depicted before it can be excluded that a line operator has moved from one line to another line in that short time. Such login cases represent a good indication that a malicious operator intends to start a harmful operation. Of course, the time interval has to be defined at engineering time for that site comprising several production lines. A reasonable time interval (e.g. >5 min) helps not to produce too many «false positive». The term «false positive» stands for a result that indicates a given condition exists, when it does not. Additionally in the user management can be foreseen not to allow multiple logins of the same operator or when multiple logins are allowed, that some operations need a single login otherwise, they may not be launched.

6. Statistical Analysis on Unauthorized Requests

This category "Statistical analysis on unauthorized requests" is explained by an example.

An operator tries to access a resource, which he should not even know. Of course, it is not suggested to trace a single error because there is no clue if it is due to an error or a voluntary operation. For this category, the frequency is a good indicator. E.g. a potential suspected operation launched by a specific operator can be the repeated request of resource that always results in an error or returns without success (i.e. for access denial). This situation reveals a strange behavior of said operator, since it is always failing systematically. Technically speaking, this can be the proof of malicious scanning activities.

In order to detect operators with malicious intentions a statistical approach contributes to a solution (e.g. via an unsupervised neural network, for instance trained following the paradigm of Self-Organizing Map). This statistical approach is a base for defining a correct behavior and for recording the current operation deviation. The recorded deviations can vary depending from the resource, and so it should be a tolerance:

A human resource (mapped in a shift calendar) can be subjected to a higher degree of variation respectively deviation.

An equipment or a tool, being programmed (mapped in an equipment calendar) should need a small tolerance.

7. Statistical Analysis of Operations Launched by an Operator

A statistical analysis of operations launched by an operator is used in order to reveal deviations. Example of such an analysis: A specific operation, which is permitted to be launched by a specific operator but this operation should not be launched in the daily routine of the operator.

The concept here is that a set of "roles" is configured for the MES-system. These roles are not referring to Access and Authorization roles, but to "operational" ones; examples:
Role "Line3 Packaging operator",
Role "forklift driver",
Role "Work Center X assembly line worker" and so on.

Each worker/operator is catalogued in at least one of these roles.

With this statistical analysis of operations a behavioral model for each role is created in order to define the most common operations patterns. The model creation and definition can be performed via machine learning algorithms (both supervised and unsupervised ones). This allows bypassing the privacy problem on tracking the operations launched by each operator. The produced model gives a statistical deviation analysis. However in practice the operator/worker behavior is subject to changes (typically workers get more used to their tasks with time), so a periodic refinement cycle for refining the model is required. Even in this case, the machine learning can become a good approach.

The above described detection system is rule based. However, the same inputs can be used for creating a machine-learning model, for instance, for having the limits tuned on the real use case (and refined too).

Reference is made to FIG. 4: The machine learning model input comprises the following tuple:
The user role, this should be the main cluster identifier,
the activities/operations to be performed or launched, and
the time frame.

The results of the analysis of the operator behavior deviations serve as an input for an Intrusion Detection System IDS. Each time a specific operation has been launched and may be considered as an operation launched by a suspected operator such an event will entered into an event log-file Event Tracer EvTr (cf. FIG. 2) and which is stored a repository. Those events will be analyzed by the customer IDS.

It is necessary to adapt an exception manager able to suppress some warnings related to not conventional behaviors but completely in the norm. For instance, an operator can access remotely a resource out from his shift. It will be the Site\Line Security Manager duty to define properly the exceptions, not to overdo and define very fine one. Otherwise, each time when a positive is detected, both false and true, this positive will simply be discarded due to some exception.

For the category "Shift Calendar" it is necessary to specify a time plan with a combination of shift and exception. More generically, this represents a combination of time-periods. A time-period can be characterized for being associated to a certain class, for instance
"night-shift",
"daily-shift",
"planned strike", etc.

In our invention, we always consider that a time-period and a resource (it may be a human or equipment) is associated to a time-period in order to have a temporal description.

Figure 2:
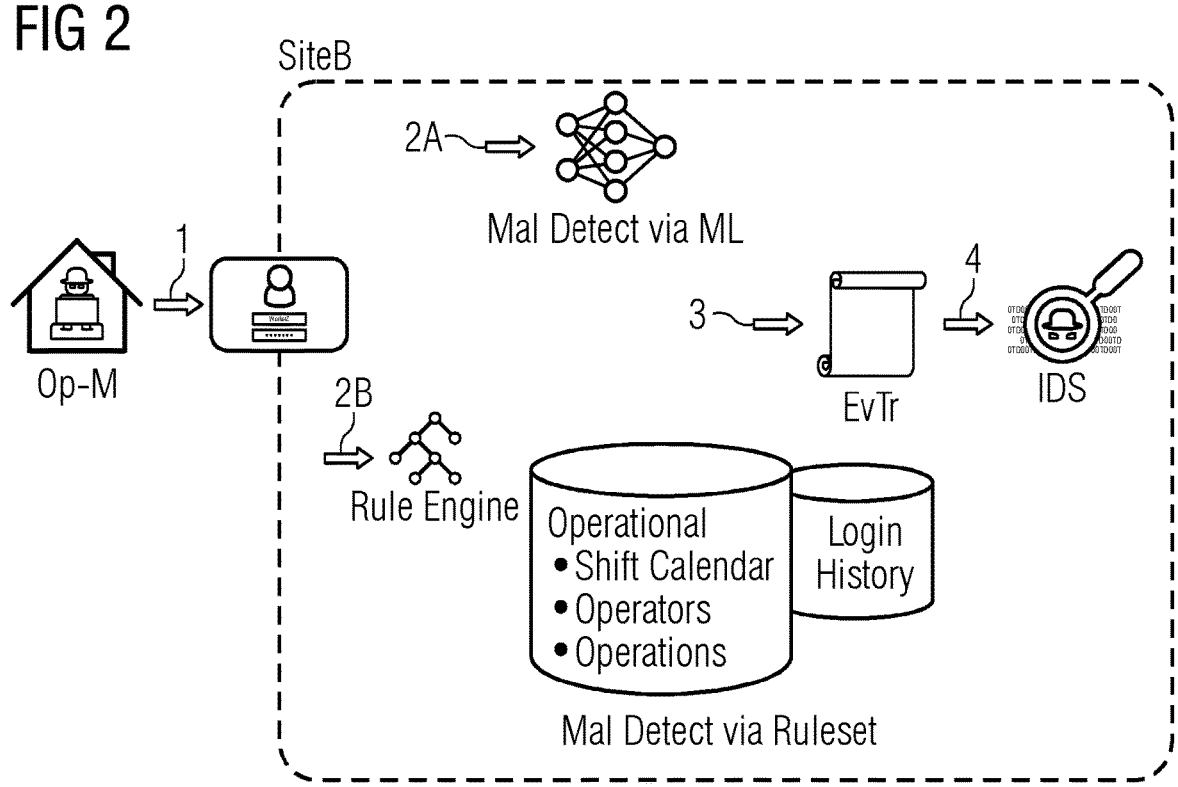
FIG. 2 is an illustration of an example of a procedure for malicious operation detection.

FIG. 2 shows an embodiment of a method for malicious operation detection. It is assumed that a (remote) login to a site from a malicious operator Op-M has taken place. It has to be emphasized that this case represents already a very pessimistic respectively a severe case since several layers of access security have been bypassed: Authentication layers. Just for explaining the geographical setup reference is made to FIG. 1: Two production sites A and B belong to the same group of companies (not necessarily to the same company): SiteA and SiteB located according to FIG. 1 on different continents. Assume in production SiteA works Operator Op-A. Somehow, a malicious operator Op-M got access to the credentials of the current operator Op-A, e.g. via social engineering. The social engineering operation is actually directed to obtain information from the current production located in SiteB. Like it often happens for multinational company, a shared corporate User and Access Management allows Operator Op-Z to connect himself to SiteB, for instance, granting maintenance capability. However, no maintenance activity is currently scheduled and the Site Security Manager did not define any exception in the intrusion detection system.

Again, reference is made to FIG. 2: Assume the Malicious Operator Op-M manages to login 1 successfully since the credentials are valid and correct. The login activity is passed as input to the proposed detection system. In case of a machine-learning model, it will compare the pattern with the produced model and verify how it diverges from the normality, cf 2A in FIG. 2. In case of a rule-based algorithm, a process will compare the current login with the historical login, verifying if an operator is meant to be in the proper site and if an exception has been configured, cf 2B in FIG. 2. It has to be emphasized, that these two detections are mutually exclusive.

In case the operation is labelled as a malicious one, cf 3 in FIG. 2, because no exception has been configured, an entry into the event trace EvTr is written. The IDS will automatically analyse this entry 4 and if required perform the needed actions.

A possible problem will raise if an exception was indeed configured for a maintenance activity. In this case, the login will pass without raising any internal alert and the malicious operator Op-M will be logged in. At this point, however, it will start requesting resources as e.g. web ones or data: This solution will start analysing this kind or requests, verifying if they were scheduled and meant to be request by Operator Op-X remotely during a maintenance activity. It is highly probable that they are not, and so the malicious operator can be finally detected. In this case, the detection can happen either because the malicious Operator is requesting resources that are not used for maintenance activity or because due to the access role restriction is starting to get unauthorized exception responses.

The following is a summary list of reference numerals and the corresponding structure used in the above description of the invention and a glossary:
Login2A Detecting malicious operations by a machine-learning model
2B Detecting malicious operations by a rule-based algorithmLabelling an operation as malicious
Forwarding to a IDS
Cal Shift calendar, equipment calendar
d Distance between two production lines of a site
DoS Denial-of-service
EvTr Event trace
ICT Information and Communication Technology
IDS Intrusion Detection System
IIoT Industrial Internet of Things
ISA-95 or ANSI/ISA-95 is an international standard from the International Society of Automation for developing an automated interface between enterprise and control systems, source:
IT Information Technology
LineA, LineB Production line
Log log file containing login/logout history
MES Manufacturing Execution System
ML Machine Learning model
MOM Manufacturing Operations Management
Op, OP-Z Operator
Op-LA, Op-LB Operator for production line A, line B
Op-M Malicious operator
OT Operational Technology
SaaS Software as a service is a software licensing and delivery model in which software is licensed on a subscription basis and is centrally hosted; source:
Site, SiteA, SiteB production site comprising at least one production line

LIST OF CITED DOCUMENTS

[Doc 1]«A Comparison of Methods for Implementing Adaptive Security Policies»
http://static.usenix.org/legacy/publications/library/proceedings/sec98/full_papers/loe/loe.pdf retrieved on Apr. 25, 2018.
[Doc 2]
https://www.ge.com/digital/sites/default/files/Architecting-a-Robust-Manufacturing-Network.pdf
[Doc 3]
US 2014/0059578 A1—APPLICATIONS GENERATING STATISTICS FOR USER BEHAVIOR

The invention claimed is:
1. A method for a safe guard detection of unexpected operations launched by an operator for a manufacturing execution system (MES-System), wherein the MES-System includes:
a first database including:
a set of operations;
a set of operators;
calendar information for a shift;
calendar information for equipment of the MES-System;

a second database including:
   a login history of carried out logins of the operator;
   a set of rules defining allowed combinations of operations being launched by the operator at a specific time according to a content of the first database;
which method comprises the steps of:
   checking launched operations as to whether the launched operations comply with the set of rules;
   storing a launched operation together with data identifying the operator and operator login data as an entry in an event trace file in case of non-compliance of the launched operation;
   analyzing entries in the event trace file by an intrusion detection system;
   generating alerts based on an analysis of the entries in the event trace file; and
   wherein the step of checking launched operations includes at least one step selected from the group consisting of:
   1) crosschecking of logins for detecting, whether the operator logs-in himself at different places at a same time where such simultaneous logins may not be expected,
   2) determining whether an operation complies with an order scheduling being defined by the calendar information in the first database, and
   3) performing a comparison of a login time of the operator with the calendar information for a shift stored in the first database.

2. The method according to claim 1, wherein the step of checking launched operations includes the step of crosschecking of logins for detecting, whether the operator logs-in himself at different places at a same time where such simultaneous logins may not be expected.

3. The method according to claim 1, wherein the step of checking launched operations includes the step of determining whether an operation complies with an order scheduling being defined by the calendar information in the first database.

4. The method according to claim 1, wherein the step of checking launched operations includes the step of performing a comparison of a login time of the operator with the calendar information for a shift stored in the first database.

5. A method for a safe guard detection of unexpected operations launched by an operator for a manufacturing execution system (MES-System), where the MES-System includes:
   a first database including:
      a set of operations;
      a set of operators;
      calendar information for a shift;
      calendar information for equipment of the MES-System;
   a second database including a login history of carried out logins of the operator;
   a machine learning model;
which method comprises the steps of:
   cataloging the operator in a given role in the MES-System;
   feeding, in a learning phase, a learning module being part of a machine learning model with launched operations for that role;
   checking, in a run time phase, the launched operations as to whether the launched operations comply with the operations in the learning module;
   storing a launched operation together with data identifying the operator and operator login data as an entry in an event trace file in case of non-compliance of the launched operation;
   analyzing entries in the event trace repository by an intrusion detection system and based on an analysis generating alerts; and
   wherein the step of checking the launched operations includes at least one step selected from the group consisting of:
   1) crosschecking of logins for detecting, whether the operator logs-in himself at different places at a same time where such simultaneous logins may not be expected,
   2) determining whether an operation complies with an order scheduling being defined by the calendar information in the first database, and
   3) performing a comparison of a login time of the operator with the calendar information for a shift stored in the first database.

6. The method according to claim 5, which further comprises repeating the learning phase in order to get a refinement of allowed operations.

7. The method according to claim 5, wherein the machine learning model input comprises:
   a user role;
   operations to be performed or launched; and
   a time frame.

8. The method according to claim 5, wherein the step of checking launched operations includes the step of crosschecking of logins for detecting, whether the operator logs-in himself at different places at a same time where such simultaneous logins may not be expected.

9. The method according to claim 5, wherein the step of checking launched operations includes the step of determining whether an operation complies with an order scheduling being defined by the calendar information in the first database.

10. The method according to claim 5, wherein the step of checking launched operations includes the step of performing a comparison of a login time of the operator with the calendar information for a shift stored in the first database.

11. The method according to claim 10, wherein the calendar information for the shift indicates whether the operator is meant to be at work and a geographical area at which the operator is expected to be at work.

12. The method according to claim 4, wherein the calendar information for the shift indicates whether the operator is meant to be at work and a geographical area at which the operator is expected to be at work.

* * * * *